Patented Apr. 10, 1928.

1,665,962

UNITED STATES PATENT OFFICE.

CHARLES WILLIAM JENNER, OF NEW WESTMINSTER, BRITISH COLUMBIA, CANADA.

STORAGE-BATTERY PLATE AND METHOD OF PRODUCING SAME.

No Drawing.     Application filed June 2, 1927. Serial No. 196,142.

My invention relates to improvements in storage battery plates and method of producing same, the object of which is to produce a structure having a high electrochemical activity, a high degree of porosity and a cohesiveness which will prevent disintegration due to excess charging or discharging. Further objects are to produce a plate entirely of electrolytically pure lead alone, without the admixture of red lead, litharge, or any other substance; also to produce a plate which, owing to its electrochemical activity and porosity, may be made to many times the thickness of plates now in common use, which is immune from buckling or sulphation and in consequence can be set up without the use of separators of any kind, and further one which is extremely durable.

The invention consists essentially of a plate with or without a lead grid and which is formed from electrolytic lead reduced to a state of high division and bonded together into a porous mass, as will be more fully described in the following specification.

In order that the lead may be reduced to a state of high division, I take a plurality of lead balls and place them in a perforated metal drum which is rotated to cause the balls to rub one against the other, producing a friction which results in a light coating of sub-oxide of lead being formed thereon. This sub-oxide is rubbed off the balls during the continued rotation of the drum and falls through the apertures in a state of high division into a suitable receptacle below, which according to the present method of production will pass a 200 mesh screen. This substance readily assimilates moisture from the atmosphere when left exposed, thus becoming a hydrated sub-oxide of lead suitable for the purpose of battery plate construction. I mix the hydrated sub-oxide of lead thus produced with a diluted sulphuric acid $H_2SO_4$ (preferably chemically pure) into a stiff consistency or paste which may then be moulded into plate form or applied to lead plate grids in the usual way and allowed to become thoroughly dry. The plates thus made are suitable for "forming" as either positive or negative plates, such forming consisting of immersing two groups of suitably connected and properly insulated plates in an electrolytic bath and passing a direct current through them. I have found that highly satisfactory results are obtained in the forming process by continuing the flow of current through the groups of plates for a period equivalent to three times their ultimate ampere hour capacity.

The mixing of this finely divided and hydrated sub-oxide of lead with dilute sulphuric acid converts the mass into a body of interlocked flakes of lead sulphate possessing innumerable interstices into which the gases evolved during electrochemical change are discharged without imparting strain to the material itself such as would produce disintegration, heating or buckling of the plate formed by such material. When the mass is applied to a plate grid, the dilute sulphuric acid sulphates the metal of the grid, causing the paste to adhere tenaciously thereto, so that a homogeneous plate is formed which is not liable to damage through shock or serious abuse. The extreme porosity of the paste permits a perfect circulation of electrolytic acid throughout the entire body of the plate, thus enabling every particle thereof to serve as active material and to undergo its full electrochemical change in perfect unity, regardless of the position of any of the particles, whether on the surface or intermediate the opposing faces of the plate.

In the process above described it will be observed that neither red lead, litharge or any other filler or binder is used such as are necessary components of the accepted type of battery plate, that the entire plate consists of electrolytic lead first reduced to a finely divided state, oxidized by atmospheric air and hydrated, which is subsequently moulded into suitable form and bonded by electrochemical action into a totally active metallic medium of high porosity, capable of complete impregnation by the electrolyte.

It will also be understood that with such a plate, the charging rate may be materially increased and the total capacity of a battery fitted with such plates will be of a far greater ampere hour capacity per unit of weight of its plates than any battery of the present accepted type.

What I claim as my invention is:

1. The method of producing a storage battery plate which consists of taking electrolytic lead, reducing it to a state of fine division by friction, of combining the resultant particles with oxygen and of mixing the oxidized material with dilute sulphuric acid and moulding the mass into a plate.

2. The method of producing a storage battery paste which consists of placing balls of electrolytic lead in a drum and rotating the drum to cause a frictional removal of particles of lead from the balls and of mixing said particles with a diluted acid.

Dated at New Westminster, B. C., this 13th day of May, 1927.

CHARLES WILLIAM JENNER.